(12) United States Patent
Ma

(10) Patent No.: US 8,813,136 B2
(45) Date of Patent: Aug. 19, 2014

(54) DATA ON DEMAND USING A CENTRALIZED DATA STORAGE DEVICE

(75) Inventor: Kenneth Ma, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 2688 days.

(21) Appl. No.: 11/049,771

(22) Filed: Feb. 3, 2005

(65) Prior Publication Data

US 2006/0107293 A1 May 18, 2006

Related U.S. Application Data

(60) Provisional application No. 60/628,439, filed on Nov. 15, 2004.

(51) Int. Cl.
*H04N 7/16* (2011.01)
*H04N 7/18* (2006.01)
*H04N 7/173* (2011.01)

(52) U.S. Cl.
USPC ........ 725/78; 725/1; 725/74; 725/83; 725/86; 725/87; 725/92

(58) Field of Classification Search
CPC ............. H04N 1/214; H04N 21/2143; H04N 21/2182; H04N 21/21825; H04N 21/2225
USPC ...................................... 725/78–101, 1–8, 74
See application file for complete search history.

(56) References Cited

U.S. PATENT DOCUMENTS

| | | | | |
|---|---|---|---|---|
| 5,751,282 A * | 5/1998 | Girard et al. | ..................... | 725/91 |
| 5,809,239 A * | 9/1998 | Dan et al. | ........................ | 725/94 |
| 6,505,281 B1 | 1/2003 | Sherry | | |
| 6,567,981 B1 * | 5/2003 | Jeffrey | ............................. | 725/80 |
| 6,769,127 B1 * | 7/2004 | Bonomi et al. | ................. | 725/94 |
| 7,272,844 B1 * | 9/2007 | Bankers et al. | ................. | 725/78 |
| 7,395,546 B1 * | 7/2008 | Asmussen | ........................ | 725/80 |
| 2002/0092021 A1 * | 7/2002 | Yap et al. | ......................... | 725/55 |
| 2002/0154157 A1 * | 10/2002 | Sherr et al. | ..................... | 345/716 |
| 2003/0035075 A1 * | 2/2003 | Butler et al. | ..................... | 348/734 |
| 2003/0046470 A1 * | 3/2003 | Sivertsen | ...................... | 710/304 |
| 2003/0115608 A1 * | 6/2003 | Armstrong et al. | ............. | 725/78 |

(Continued)

OTHER PUBLICATIONS

Hargrave'S Communication Dictionary, Definition of "flash memory", 2001, 2 pages, Institute of Electrical and Electronics Engineers, Inc.

(Continued)

*Primary Examiner* — Nasser Goodarzi
*Assistant Examiner* — Kyu Chae
(74) *Attorney, Agent, or Firm* — Brinks Gilson & Lione

(57) ABSTRACT

Herein described is a system and a method of storing and distributing multimedia data selections to the tenants or occupants of a multi-unit building. The multi-unit building may comprise a hotel, motel, office complex, or apartment complex, for example. The storage capacity of the data storage device may be easily expanded by way of adding one or more additional hard disk drives. The data storage device may be conveniently located in a front office or manager's office of the multi-unit building. The system distributes one or more of the stored multimedia data selections to one or more display devices communicatively coupled to the data storage device. Each of the one or more display devices may be located in corresponding units of the multi-unit building. The one or more display devices are used to view the multimedia data selections requested by a tenant or occupant.

23 Claims, 5 Drawing Sheets

(56) References Cited

U.S. PATENT DOCUMENTS

| | | | |
|---|---|---|---|
| 2003/0126132 A1* | 7/2003 | Kavuri et al. | 707/10 |
| 2003/0172146 A1* | 9/2003 | Collins | 709/223 |
| 2004/0093613 A1* | 5/2004 | Boston et al. | 725/21 |
| 2004/0111748 A1* | 6/2004 | Bushey et al. | 725/87 |
| 2004/0117831 A1* | 6/2004 | Ellis et al. | 725/53 |
| 2004/0190864 A1* | 9/2004 | Tannenbaum | 386/46 |
| 2004/0258390 A1* | 12/2004 | Olson | 386/46 |
| 2004/0261110 A1* | 12/2004 | Kolbeck et al. | 725/78 |
| 2005/0028208 A1* | 2/2005 | Ellis et al. | 725/58 |
| 2005/0155077 A1* | 7/2005 | Lawrence et al. | 725/109 |
| 2005/0155079 A1* | 7/2005 | Chen et al. | 725/115 |
| 2005/0171661 A1 | 8/2005 | Abdel-Malek et al. | |
| 2005/0177853 A1* | 8/2005 | Williams et al. | 725/81 |
| 2005/0196129 A1* | 9/2005 | Kobayashi | 386/46 |
| 2005/0198194 A1 | 9/2005 | Burkey | |
| 2005/0283791 A1* | 12/2005 | McCarthy et al. | 725/1 |
| 2007/0157253 A1* | 7/2007 | Ellis et al. | 725/61 |
| 2007/0234390 A1* | 10/2007 | Bankers et al. | 725/78 |
| 2008/0013919 A1* | 1/2008 | Boston et al. | 386/83 |

OTHER PUBLICATIONS

The Penguin English Dictionary, Definition of "RFID", 1986, 2 pages, Merriam-Webster Inc. and Longman Group Ltd.

Eagleson, J. et al., "RFID/Automotive Applications", Feb. 1997, pp. 1-13, Wireless Symposium, Santa Clara, CA.

* cited by examiner

DATA ON DEMAND USING A CENTRALIZED DATA STORAGE DEVICE

CROSS-REFERENCE TO RELATED APPLICATIONS/INCORPORATION BY REFERENCE

This application makes reference to and claims priority from U.S. Provisional Patent Application Ser. No. 60/628, 439, entitled "DATA ON DEMAND USING A CENTRALIZED DATA STORAGE DEVICE", filed on Nov. 15, 2004, the complete subject matter of which is incorporated herein by reference in its entirety.

This application makes reference to:
U.S. application Ser. No. 11/049,905 filed Feb. 3, 2005;
U.S. Application Ser. No. 60/562,847 filed Apr. 15, 2004;
U.S. Application Ser. No. 60/648,634 filed Jan. 31, 2005;
U.S. application Ser. No. 11/049,772 filed Feb. 3, 2005;
U.S. application Ser. No. 11/049,798 filed Feb. 3, 2005; and
U.S. application Ser. No. 11/049,768 filed Feb. 3, 2005.

The above stated applications are hereby incorporated herein by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When providing data services such as video programming to one or more units in a multi-unit building that serves multiple occupants or tenants, an owner or landlord will determine the most cost effective way to provide the video to the multiple occupants or tenants. For example, an owner of a hotel may utilize multiple video playing devices in each and every unit of the hotel. The playing devices may comprise video cassette recorders or CD-ROM players, for example. However, an occupant or tenant may need to provide his own source material. Furthermore, the costs of installing playing devices in every room may not be desirable. Subsequently, the per unit maintenance issues may not be desirable. Alternatively, the owner may subscribe to services provided by a multimedia services provider. Often however, these services may be very expensive to the owner of the hotel.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a system and a method of storing and distributing video and/or multimedia data to the tenants or occupants of a multi-unit building. The multi-unit building may comprise a lodging establishment, office complex, or apartment complex, for example.

In a representative embodiment, a method of providing one or more multimedia data selections to one or more units of a multi-unit building comprises receiving an instant request for a multimedia data selection of the one or more multimedia data selections, wherein the request is made by a tenant or an occupant of a unit of the one or more units of the multi-unit building. The method further comprises transmitting the multimedia data selection to the display device such that a display device displays the selection to the tenant or the occupant. The one or more multimedia data selections are stored in a data storage device, and data storage device is capable of increasing its storage capacity by accepting one or more data storage drives.

In a representative embodiment, a method of conveniently distributing one or more multimedia selections stored in a data storage device comprises receiving a request to view one or more selections by one or more tenants of a multi-unit building, and transmitting the one or more requested selections to the one or more tenants.

In a representative embodiment, a video on demand system used in a multi-unit building comprises a scalable data storage device capable of facilitating expansion using one or more data storage drives, wherein the scalable data storage device stores one or more videos capable of being requested by a tenant of the multi-unit building.

These and other advantages, aspects, and novel features of the present invention, as well as details of illustrated embodiments, thereof, will be more fully understood from the following description and drawings.

DETAILED DESCRIPTION OF THE INVENTION

Figure 1:
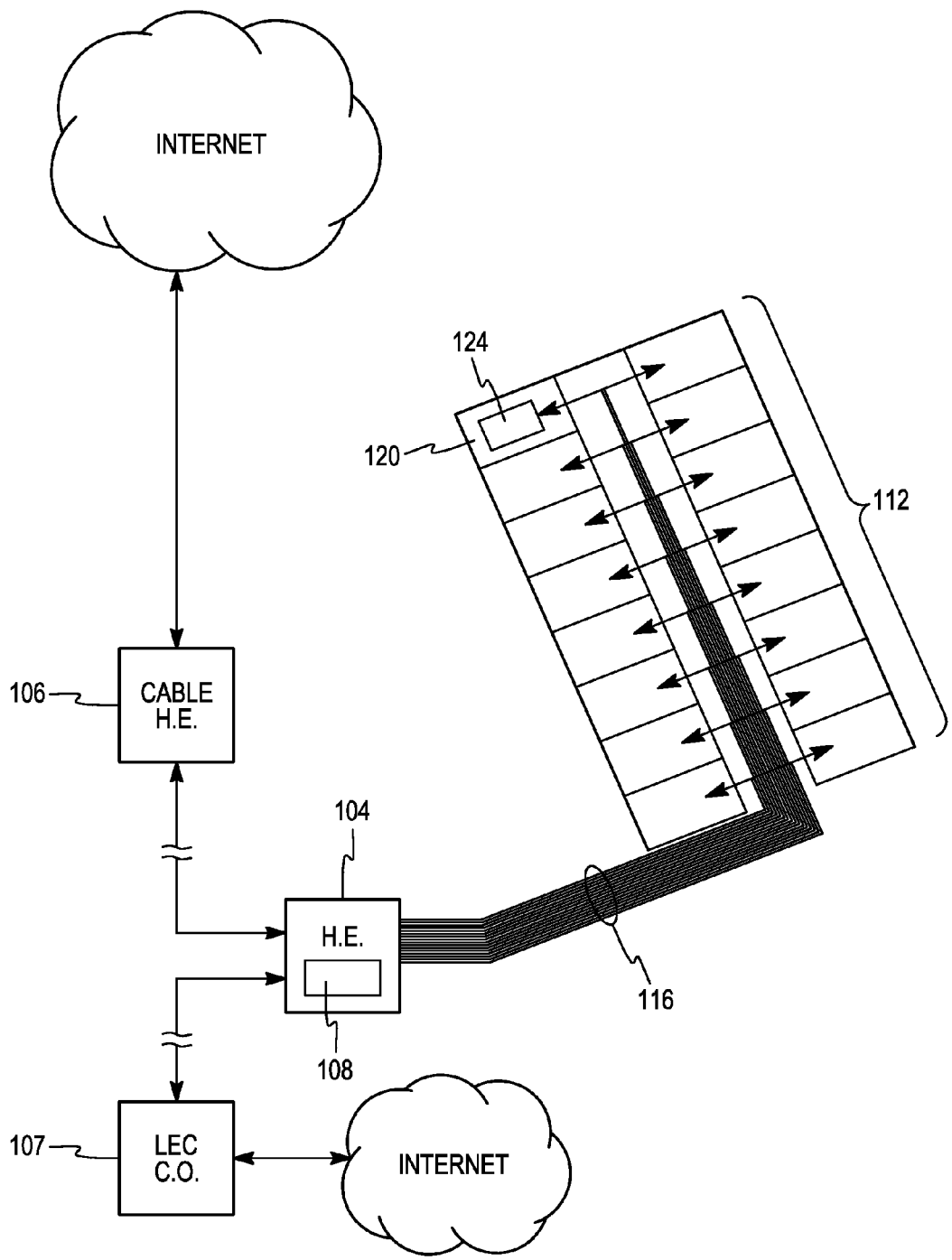
FIG. 1 is a system block diagram of a data on demand data storage system in accordance with an embodiment of the invention.

Various aspects of the invention provide a system and method of storing and distributing data, such as video and/or multimedia, from a data storage device. The data may be stored using one or more data storage drives within the data storage device. The data storage device is used as a centralized storage facility for one or more multimedia files or programs. Additionally, the various aspects of the invention provide a system and method for distributing the stored data to one or more display devices communicatively coupled to the data storage device. In a representative embodiment, each of the one or more display devices may be located in each unit of a lodging establishment, such as a hotel or motel. Yet, in another representative embodiment, each of the one or more display devices may be located in each apartment of a multi-unit apartment building. The one or more display devices may comprise any device capable of receiving and displaying the digital video. The data or video may be distributed as required (i.e., based on demand) when a tenant or an occupant of the hotel, motel, or apartment building requests a particular selection. As a consequence, the storage system which distributes the data may be referred to as a data on demand storage system. Alternatively, the data on demand storage system may be referred to as a video on demand storage system when the data provided by the data storage device comprises video. The one or more display devices may communicate with the data storage device using any type of communication interface, such as wireline or wireless types of interfaces. The one or more display devices are used to view the video and/or multimedia requested by the tenant or occupant. The one or more display devices and data storage device may be used within a network that utilizes a data protocol such as IEEE 802.3x or IEEE 802.11x. For example, the one or more display devices may request one or more video and/or multimedia selections. The request may occur by way of IEEE 802.3x. Appropriately, the aforementioned data storage device, hereinafter, may be termed or referred to as a network attached storage device (NAS). As a way of acquiring multimedia programming or selections, the data storage device may capable of receiving and storing multimedia data provided by a telecommunications carrier such as any ordinary cable TV operator. The data may be received by way of a modem. The telecommunications carrier may comprise a cable operator, local exchange carrier or satellite operator, for example.

Use of a data storage device that acts as a centralized storage facility provides a cost effective method of delivering multimedia programming to one or more tenants of a multi-unit building. Various aspects of the present invention allow the owner or landlord of such a building to consolidate data storage devices that otherwise would be located in each unit of the multi-unit building. Furthermore, additional storage capacity may be easily implemented at the data storage device by way of adding one or more data storage drives, such as hard disk drives. In a representative embodiment, the data storage device may be conveniently located in a front office, manager's office, or administrative office of an exemplary hotel, office complex, or apartment complex. In a representative embodiment, the data storage device may be used to replace and obviate the services provided by an expensive third party multimedia service provider.

In a representative embodiment, the data storage device may comprise one or more data storage drives, such as hard disk drives, or any other type of media drive. The data storage device may comprise a combination of different types of data storage drives. A data storage drive may comprise any type of media capable of storing data. The media types may comprise magnetic, optical, flash memory, and the like.

Hereinafter, the term "hard disk drive" alternatively may refer to a data storage drive or any drive or component comprising a media used to store data. In a representative embodiment, one or more data storage drives or hard disk drives may be incorporated into a data storage device. The data storage device comprises the one or more data storage drives or hard disk drives. In a representative embodiment, the data storage device facilitates the incorporation of the one or more additional data storage drives or hard disk drives.

Various aspects of the present invention provide for a data storage device that is scalable such that additional data storage drives may be easily added to the data storage device. Because the data storage device or NAS is scalable, storage expansion is easily accomplished, for example, when the variety of the digital video programming or number of selections is increased. The capacity of the video on demand storage system may be increased easily by connecting one or more additional data storage drives within the data storage device. In a representative embodiment, the additional drive(s) may be connected or inserted into the data storage device using a carrier or "sled" for easy insertion and removal of the additional data storage drive(s). In a representative embodiment, the one or more data storage drives utilized by a data storage device may be easily swapped by any lay person, such as a hotel clerk, when the data storage device is powered down. In an alternate representative embodiment, a data storage drive, such as a hard disk drive, may be immediately swapped when power is on (i.e., "hot-swapped"), for example, when a hard drive failure occurs in one of the drives used by the NAS. Various aspects of the invention allow for creation of a data pool over one or more data storage drives of the data storage device. The data pool may comprise a video file that spans two data storage drives, for example. Unallocated space over the one or more data storage drives may be re-partitioned and then subsequently concatenated in order to generate a data pool. Portions of multiple data storage drives may be used to create the data pool.

In a representative embodiment, the video on demand data storage system may be used in conjunction with an accounting system for billing or charging a tenant or occupant based on his usage of the material provided by the video on demand data storage system. Service charges may be included in an tenant's bill when a particular video is transmitted to a tenant's display device. The accounting system may be owned and operated by a hotel/motel proprietor or an apartment landlord, for example.

FIG. 1 is a system block diagram of a data on demand data storage system in accordance with an embodiment of the invention. As illustrated, the system comprises a local head end 104 resident in an office of a multi-unit building. The local head end 104 may serve as a distribution point for data to one or more units of a multi-unit building. The office may correspond to the front office of a hotel or motel, for example. In other representative embodiments, the office may correspond to a manager's office in an apartment complex or an administrator's office in a commercial office complex. The head end 104 may serve as the centralized distribution point for all video content to be distributed to the units 112 of the multi-unit building. The local head end 104 may be connected to the Internet by way of a data modem. A telecommunications carrier (such as a cable carrier or operator) may provide Internet service to the head end 104. For example, a cable operator may provide data to the local head end by way of its cable head end 106 as illustrated in FIG. 1. A local exchange carrier may provide data to the local head end by way of its central office 107, for example. Of course, the Internet may be accessed by users in each of the units 112 by way of conductive media 116. The conductive media, in this instance, may comprise IEEE 802.3x (Ethernet). The NAS or data storage device 108 may reside within the head end 104, for example. The NAS or data storage device 108, of course, stores multimedia content to be distributed on demand, when requested by one or more tenants or occupants of the multi-unit building. The NAS (or data storage device) 108 may comprise a processor, memory, and one or more data storage drives. The NAS 108 may be appropriately configured to store as many multimedia selections as necessary. The storage capacity of the NAS 108 may be expanded by adding to it one or more data storage drives or hard disk drives. The multi-unit building may comprise an apartment complex, a hotel, or motel, for example. The head end 104 may distribute video/multimedia content to the one or more units 112 of the multi-unit building using a communications medium such as the conductive media 116 shown in FIG. 1. The conductive media 116 may comprise any type of cabling or wiring used for communicating video data such as one or more coaxial cables, for example. As illustrated, the cabling is distributed to the one or more units 112. As shown in a unit 120, each cable (of the cabling) terminates at a display device 124. In addition to viewing video or multimedia data it receives from the data storage device, the display device 124 may receive and process requests from the one or more tenants or occupants of the multi-unit building. The tenants or occupants may request one or more video or multimedia selections. In a representative embodiment, the conductive media 116 comprises coaxial cabling and 802.3x (Ethernet) cabling. The coaxial cabling may be used for distributing video/multimedia content from the NAS into the one or more units 112. The 802.3x cabling may be used to communicate requests made by a user in each of the one or more units 112. The requests may comprise one or more requests to view one or more video/multimedia selections. The requests may occur by a user viewing the selections on a secure website, for example. The website may be accessed using the Internet connection provided by the multi-unit building. For the sake of simplicity, one or more display devices may also be implemented in the other units, although they are not illustrated in FIG. 1. In a representative embodiment, one or more portions (e.g., 802.3x cabling) of the conductive media 116 may not be necessary, as when communication to one or more units 112 is instead performed using a wireless protocol, such as IEEE 802.11x.

In a representative embodiment, the one or more video/multimedia selections made by one or more users in the multi-unit building may be cached using the NAS. A particular video selection may be stored in a NAS until all requests to view the video selection are satisfied. In a representative embodiment, the video selection may be stored in the NAS until one or more conditions are satisfied. A condition may comprise that there are no users who wish to view the material within a certain number of days, or certain number of hours, for example. Another condition may comprise that a video/multimedia selection is used by the one or more units 112 up to or within a certain period of time. In a representative embodiment, the NAS may schedule viewing one or more video/multimedia selections in a particular sequence or order, as determined by a user. The one or more selections may be stored in the NAS until viewed by the user. The various aspects of the invention provide a method for viewing one or more video/multimedia selections in a particular sequence at any time. The NAS, in this fashion, may provide a type of "personal video recording" storage functionality for each of the one or more units 112 in the multi-unit building.

Figure 2:
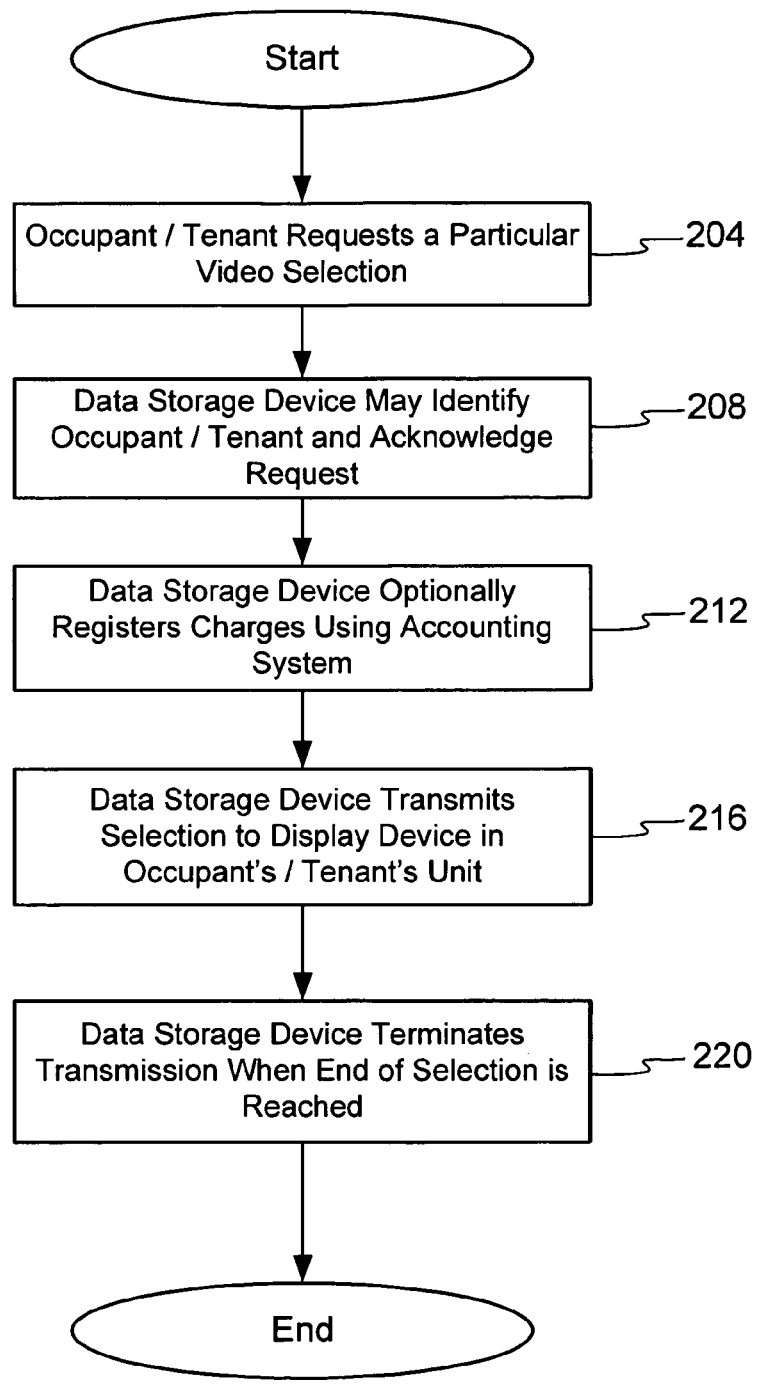
FIG. 2 is an operational flow diagram illustrating the operation of a data on demand data storage system in accordance with an embodiment of the invention.

FIG. 2 is an operational flow diagram illustrating the operation of a data on demand data storage system in accordance with an embodiment of the invention. In this representative embodiment, the multi-unit building comprises a hotel. At step 204, an occupant or tenant requests a particular data selection from his hotel room. The selection may comprise video, audio, games, or any multimedia streaming data. The occupant may use a display device, such as a television provided in the hotel room, for viewing one or more selections. The occupant may use a control device for making the selection. The control device may comprise a handheld remote control, for example. The control device may comprise a television or monitor incorporating a tactile sensitive (or touch sensitive) control screen capable of receiving selections by way of touch, for example. After the selection is made, at step 208, a data storage device, typically located within an office of the multi-unit building, receives and processes the request. As described in relation to FIG. 1, the data storage device may be appropriately located at a front office that comprises the head end of the hotel. The data storage device may employ one or more application software used for identifying the occupant and acknowledging his request. At step 212, the data storage device may optionally register one or more charges associated with the request. The one or more charges associated with the request may be applied to charges collected in an accounting system. The one or more charges may be transferred over to an accounting system, for example. Again, one or more types of application software may be used for accomplishing step 212. The application software may reside in a memory of the data storage device or NAS. The application software may be executed using a processor resident within the data storage device or NAS. At step 216, the data storage device transmits the selection associated with the request. The selection is transmitted to the associated display device, for viewing by the tenant. Next, at step 220, the data storage device terminates transmission when the end of the selection is reached. At this point, the tenant may wish to request another selection. In a representative embodiment, one or more tenants of different units of the multi-unit building may request the same selection; nonetheless, the data storage device is capable of transmitting the same selection to multiple requesters by way of a dedicated communication channel or link, such as performed using dedicated wiring, for example, to each unit of the multi-unit building.

Figure 3:
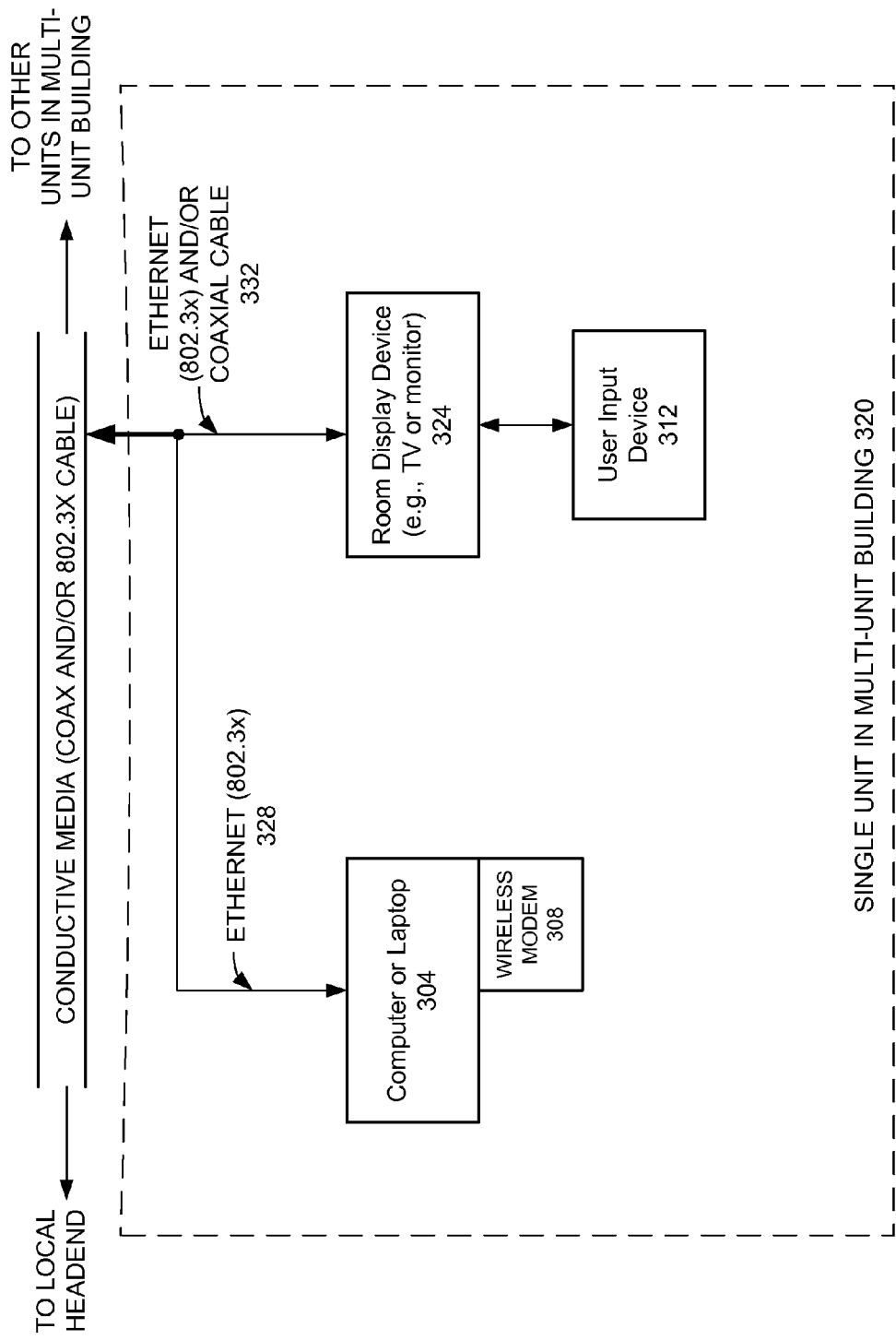
FIG. 3 illustrates a detailed functional block diagram of the data on demand system implemented within a unit of a multi-unit building, in accordance with an embodiment of the invention.

FIG. 3 illustrates a detailed functional block diagram of the data on demand system implemented within a unit 320 (or 120 in FIG. 1) of a multi-unit building, in accordance with an embodiment of the invention. As shown, the data on demand system comprises a computer or laptop 304, a wireless modem 308 communicatively coupled to the computer or laptop 304, a conductive media 316, Ethernet (802.3x) cable (such as unshielded twisted pair capable of providing 10baseT) 328, Ethernet (802.3x)/coaxial cables 332, a user input device 312 used for communicating commands provided by a user to the room display device 324, and a room display device 324 used for displaying data provided by the conductive media 316. The computer or laptop 304 may be provided as a fixture by the multi-unit building or may be owned by the user or occupant. The wireless modem 308 may comprise an 802.11x modem, which may be installed or attached within the computer and/or laptop 304. The Ethernet (802.3x) cable connects the computer or laptop 304 to the conductive media 316. The conductive media 316 is connected back to the local head end in the front office of the multi-unit building. Of course, the local head end may access the Internet by way of a connection to a cable head end, for example. The user input device 312 may comprise a remote control capable of communicating to the room display device 324 by way of any communications signal, such as an infrared signal. The user input device 312 may comprise one or more input keys allowing the user to input one or more commands and selections. The room display device 324 may comprise a processor used to control communication between itself and the user input device 312. The processor may also control communication between the room display device 324 and the NAS. The room display device 324 may comprise a television or a monitor. The room display device may be connected to the local head end by way of suitable coaxial cable and/or suitable Ethernet cabling (e.g., 10baseT/UTP (unshielded twisted pair)).

Figure 4:
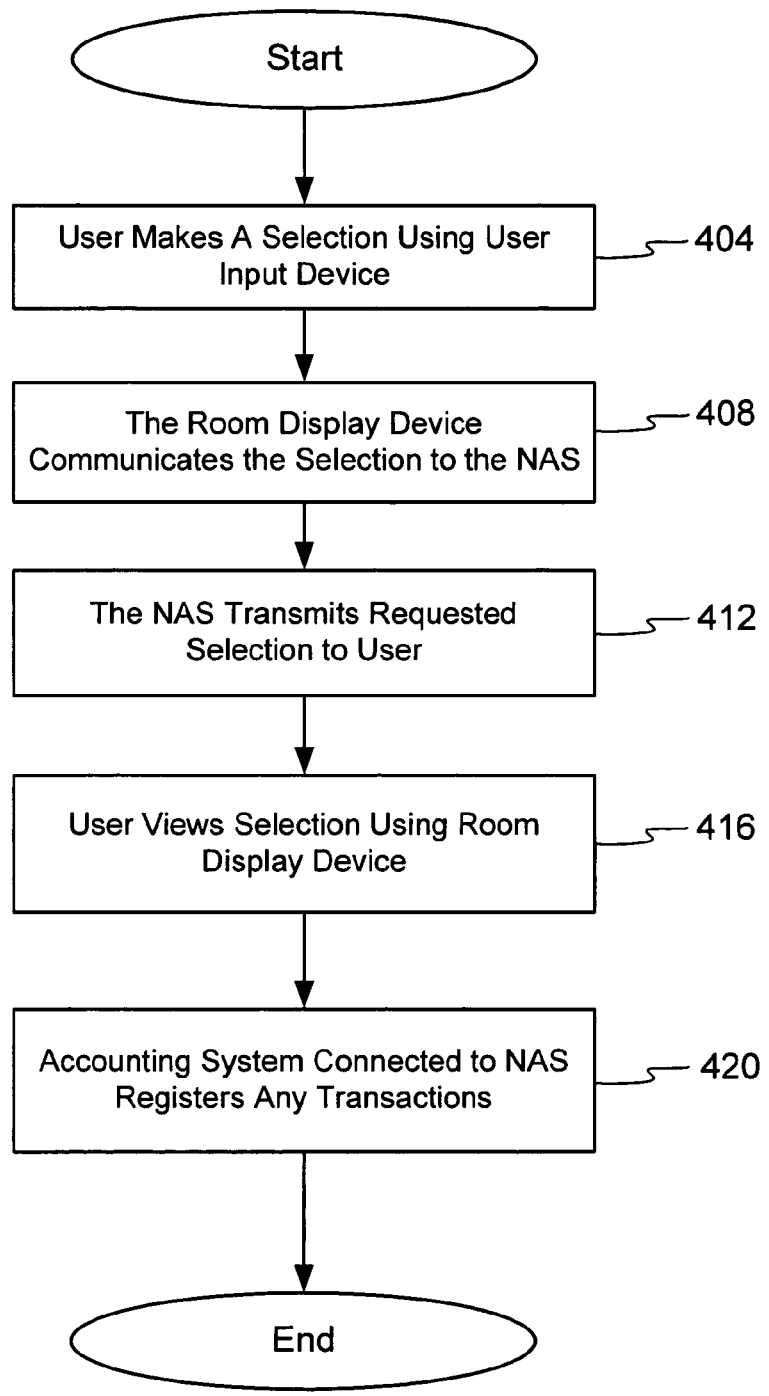
FIG. 4 is an operational flow diagram that describes the process by which a user selects one or more multimedia selections stored in a NAS by using a user input device communicatively coupled to a room display device, in accordance with an embodiment of the invention.

FIG. 4 is an operational flow diagram that describes the process by which a user selects one or more multimedia selections stored in a NAS by using a user input device communicatively coupled to a room display device, in accordance with an embodiment of the invention. At step 404, a user makes one or more selections using a user input device, as previously described in FIG. 3. The user may point the user input device such that its transmitter may appropriately transmit a signal to a sensor capable of receiving and decoding the signal. The room display device may provide a menu of viewable selections currently stored in the NAS. The viewable selections may comprise movies, videos, games, or any type of multimedia programming. At step 408, the room display device communicates the requested selection to the NAS. The conductive media is used to communicate the request back to the local head end in the front office of the multi-unit building. At step 412, the NAS, in response, transmits or plays the selection back to the room display device. Next, at step 416, the user views the selection which is received by the room display device. At step 420, an accounting system connected to the NAS may register any transactions related to any selections viewed by a user.

Figure 5:
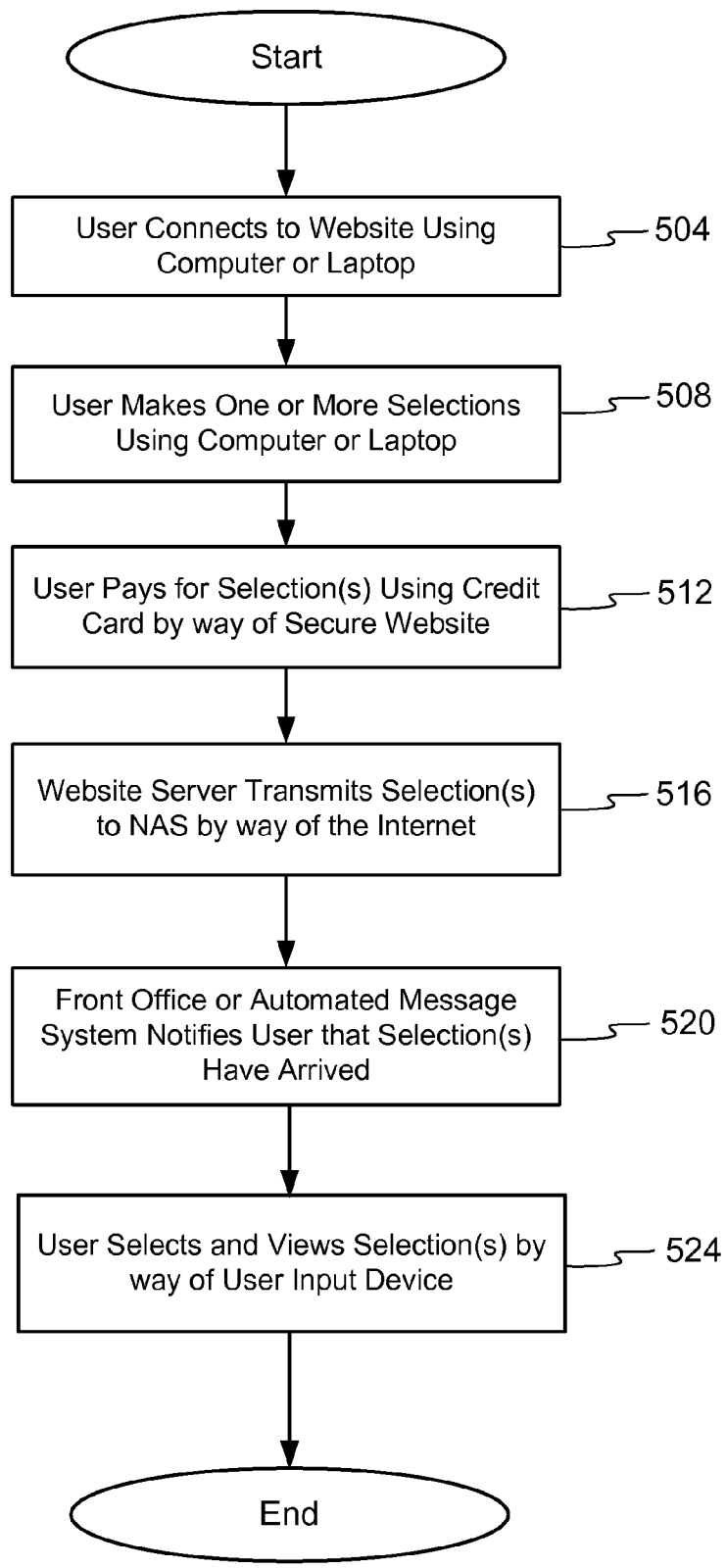
FIG. 5 is an operational flow diagram that describes the process by which a user obtains one or more multimedia selections not currently stored in the NAS, by way of making selections using a computer or laptop, in accordance with an embodiment of the invention.

FIG. 5 is an operational flow diagram that describes the process by which a user obtains one or more multimedia selections not currently stored in the NAS, by way of making selections using a computer or laptop, in accordance with an embodiment of the invention. At step 504, the user accesses the Internet using a computer or laptop and connects to a particular website. The user may provide identifying information to the website. The identifying information may comprise his name, multi-unit building name or address (i.e., hotel name), multi-unit building room number (i.e., hotel room number), and the like. The user may provide this information over a secure website. A conductive media, such as Ethernet cable, may be used to communicate to the website. The conductive media may provide Internet connectivity by way of a cable operator's head end, for example. In another representative embodiment, the computer or laptop may connect to the Internet by way of a wireless connection. In this instance, the computer or laptop may utilize a wireless modem, such as an 802.11x type of wireless modem. The front office may provide a wireless hub/router that communicates with the wireless modems. The front office may provide these wireless modems to allow its occupants to access the Internet through its wireless hub/router. As a consequence, the front office may charge an occupant a fee to use a wireless modem. Similarly, the front office may charge an occupant a fee to use Ethernet services it provides by way of an Ethernet cable. At step 508, the user may make one or more multimedia selections using the website. At step 512, the user may pay for the one or more selections using a credit card, for example. Next, at step 516, the website transmits the one or more selections over the Internet to the NAS in the multi-unit building. At step 520, the front office may notify the user that his selections are ready for viewing. The front office may notify the user using an automated messaging system. For example, a telephone messaging system may be used to record a message for the occupant, notifying him that his selections are ready for viewing. Next, at step 524, the user may make a selection of the one or more selections stored in the NAS, using his user input device. The NAS subsequently transmits the requested selection to the user. Then, the user views the selection using his room display device. After the user has finished viewing his first selection, he may use the user input device to make another selection if he purchased more than one selection.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of providing one or more multimedia data selections to one or more units of a multi-unit building comprising:
   receiving requests for said one or more multimedia data selections, said requests made by one or more occupants of said one or more units of said multi-unit building;
   transmitting said one or more multimedia data selections to corresponding display devices in said one or more units of said multi-unit building, said display devices being capable of displaying said one or more multimedia data selections to said one or more occupants,
   wherein said receiving and said transmitting are performed by a standalone data storage device which consolidates data storage of multimedia data for said one or more units of said multi-unit building, said standalone data storage device comprising a plurality of hard disk drives, wherein a video file is stored over at least two of said plurality of hard disk drives, the standalone data storage device being scalable by adding additional data storage devices so that additional storage capacity may be added to the standalone data storage device according to changing storage requirements; and
   storing respective multimedia data selections of the one or more multimedia selections in the standalone data storage device until all received requests for said respective multimedia data selections are satisfied by transmitting said respective multimedia data selections to corresponding display devices.

2. The method of claim 1 wherein said data storage device is located in said multi-unit building and wherein the additional data storage devices comprise a two or more hard disk drives.

3. The method of claim 1 wherein said requests are generated by said display devices.

4. The method of claim 1 further comprising identifying said one or more occupants and billing said occupants based on said request.

5. The method of claim 1 wherein said multi-unit building comprises a lodging establishment.

6. The method of claim 1 wherein said multi-unit building comprises an apartment complex.

7. The method of claim 1 wherein said multi-unit building comprises a commercial office complex.

8. A method of conveniently distributing one or more multimedia selections to one or more tenants, said one or more multimedia selections stored in a data storage device, said method comprising:
   storing a plurality of multimedia selections in a data storage device located in a multi-unit building, said data storage device comprising a selectable plurality of hard disk drives which consolidate in the selectable plurality of hard disk drives storage of multimedia selections of said one or more tenants, wherein unallocated space of said plurality of hard disk drives may be re-partitioned and subsequently concatenated to generate a data pool, said data pool used for storing a video file corresponding to said multimedia selection, wherein said video file is stored over at least two of said plurality of hard disk drives, the selectable plurality of hard disk drives being scalable by adding or removing data storage devices to conform storage capacity of the data storage device to variation of storage requirements due to changing variety of stored multimedia selections and changing number of stored multimedia selections;

receiving a request to view a multimedia selection, the request including data defining a tenant-specified sequence for viewing a plurality of multimedia selections of said one or more multimedia selections from a tenant of said one or more tenants, said one or more tenants occupying one or more units of said multi-unit building; and transmitting, from the data storage device said plurality of multimedia selections to said tenant in accordance with the tenant-specified sequence for viewing.

9. The method of claim 8 wherein said multi-unit building comprises a hotel or motel.

10. The method of claim 8 wherein said multi-unit building comprises an apartment complex.

11. The method of claim 8 wherein capacity of said data storage device may be easily increased by adding one or more additional hard disk drives within said data storage device.

12. A system comprising:

a standalone scalable data storage device operative to store video data and to provide video on demand, said data storage device capable of storage capacity expansion by way of receiving one or more additional data storage drives to vary storage capacity of the data storage device in response to variation in storage requirements due to variation in variety in video programming or number of stored video selections, said scalable data storage device located in a multi-unit building and consolidating at the digital storage device substantially all on-demand video storage for substantially all units of the multi-unit building, wherein a video of one or more videos is stored in a data pool generated by concatenating re-partitioned and unallocated space from portions of at least two data storage drives of said data storage device;

communications media between respective units of the multi-unit building and the scalable data storage device;

a head end in data communication with the scalable data storage device and the communications media and located in the multi-unit building, the head end including a data modem configured for data communication with the internet, the head end configured to provide data communication between a respective unit of the multi-unit building and a secure web site accessible over the internet for a tenant of said respective unit to select at the secure web site one or more video selections not currently stored at the scalable data storage device, the head end further configured to receive at the data modem the selected one or more video selections and to store the one or more received video selections in the scalable data storage device, the storage capacity of the scalable data storage device expanding as required to store the one or more received video selections.

13. The system of claim 12 further comprising a display device used for receiving and displaying said one or more videos.

14. The system of claim 13 further comprising a control device used for said requesting said one or more videos.

15. The system of claim 14 wherein said control device incorporates a touch sensitive control screen used in said display device.

16. The system of claim 13 wherein the communications media comprise a wireless modem configured to communicatively couple said scalable data storage device to said display device.

17. The system of claim 12 wherein said one or more data storage drives comprises one or more hard disk drives.

18. The system of claim 12 wherein said scalable data storage device is used in identifying said tenant by way of executing an application software resident in said scalable data storage device.

19. The system of claim 18 wherein said scalable data storage device is used in billing said tenant by way of executing said application software.

20. The method of claim 1 wherein a multimedia data selection of said one or more multimedia data selections are stored in said data storage device if there is at least one pending request for said multimedia data selection made by at least one occupant of said one or more occupants.

21. The method of claim 1 wherein a multimedia data selection of said one or more multimedia data selections are stored in said standalone data storage device if there is at least one occupant of said one or more occupants in said multi-unit building who has a pending request to view said multimedia data selection and wherein a certain period of time has not elapsed.

22. The method of claim 21 wherein said certain period of time comprises a number of days.

23. The method of claim 21 wherein said certain period of time comprises a number of hours.

* * * * *